United States Patent [19]

Reimers

[11] Patent Number: 4,507,677
[45] Date of Patent: Mar. 26, 1985

[54] METHOD OF IMPROVING THE RESOLUTION OF THE SEMICONDUCTOR SENSOR TYPE OF TELEVISION CAMERA

[75] Inventor: Ulrich Reimers, Ober-Ramstadt, Fed. Rep. of Germany

[73] Assignee: Robert Bosch GmbH, Stuttgart, Fed. Rep. of Germany

[21] Appl. No.: 476,607

[22] Filed: Mar. 18, 1983

[30] Foreign Application Priority Data

Mar. 30, 1982 [DE] Fed. Rep. of Germany ....... 3211668

[51] Int. Cl.$^3$ ............................................. H04N 9/09
[52] U.S. Cl. .................................................... 358/50
[58] Field of Search .................................. 358/52, 50

[56] References Cited

U.S. PATENT DOCUMENTS 3,975,760  8/1976  Yamanaka ............................. 358/50
4,249,203  2/1981  Yamanaka ............................. 358/50

FOREIGN PATENT DOCUMENTS 2839651  3/1979  Fed. Rep. of Germany ........ 358/50

Primary Examiner—John C. Martin
Assistant Examiner—Michael Dunnam
Attorney, Agent, or Firm—Frishauf, Holtz, Goodman & Woodward

[57] ABSTRACT

In a color television camera where the semiconductor array picture sensors for the three colors of a television signal have, for example, 420 points per line, so that the first order carrier frequency lies in the neighborhood of 8 MHz, corresponding picture points for the respective colors are offset by ⅓ of the picture point period for any one color. The green signal is used as a reference signal and the red and blue signals are separated into a high-frequency component and a component limited to a top frequency of 3 MHz. The higher frequency components of the red and blue signals are added to the green signal, so that the phase relations at the first order carrier frequency will tend to cancel, so that a wideband green component of greatly reduced high frequency interference and band limited red and blue components free of such interference are made available with very simple signal processing to improve the resolution of the television picture.

2 Claims, 2 Drawing Figures

METHOD OF IMPROVING THE RESOLUTION OF THE SEMICONDUCTOR SENSOR TYPE OF TELEVISION CAMERA

This invention concerns a method of improving the resolution of the kind of television camera that uses three sets of semiconductor picture point sensors, which is to say three picture sensor mosaics, usually for the primary colors of a color television picture.

In contrast to picture pickup tubes, semiconductor picture sensors provide scanning systems in which the optical information from illumination of the sensors is scanned in two dimensions by discrete picture points. The resolution of the generated video signals can accordingly be calculated directly from the scanning theorem from the number of points in the picture sensor. So far as the sensor construction is concerned, the raising of the resolution of the picture sensor is possible only by the extraordinarily difficult route of increasing the picture point count of the picture sensor.

Possibilities have nevertheless resulted, after more searching investigation of the signal spectrum at the output of a semiconductor picture sensor, for increasing the resolution by suitable signal processing without the necessity of modifying the design or technology of the picture sensor itself. The spectrum of the scan signal is a pulse amplitude modulated signal that consists of a baseband component and also components grouped around the pulse repetition rate and its multiples, the pulse repetition rate being a carrier frequency. The actual limitation on the resolution according to the scanning theorem results from the fact that the signal components related to the carrier frequency extend into the baseband and falsify or interfere with the baseband signal. Thus, if it should be possible to eliminate the components related to the carrier frequency a greater resolution should be available even in the case of a fixed limit on the picture point count.

A solid state television camera with a plurality of semiconductor picture sensors is already known from German published patent application DE-OS 28 39 651 in which by suitable geometric disposition of the semiconductor picture sensors and corresponding signal processing the resolution of the television camera can be improved. The signal processing involved in the system theredisclosed, however, is relatively complicated and expensive.

THE INVENTION

It is an object of the present invention to provide a method of increasing the resolution of television cameras equipped with semiconductor picture sensors without increasing the number of picture points in the picture in a way in which the signal processing can be carried out much more simply and economically.

Briefly, three sets of semiconductor picture point sensors making up the respective picture sensors are disposed so that the points of each picture sensor can be scanned with a horizontal offset between the corresponding point sensors of the respective sets, from one to the next, of 120° of the phase of the pulse repetition rate of the signals picked up from any one set of points (i.e. from any one picture sensor). Of the 3 signals picked up from the respective sets of picture points, one is used as a reference signal and the other two are separated into two components, one consisting of frequencies below about 3 MHz and the other consisting of frequencies above about 3 MHz. The higher frequency portions of the respective last-mentioned two signals are then added to the reference signal while the separated lower frequency portions are then used, along with the modified reference signal, as the processed television signal of higher resolution. In the reference signal, while can advantageously be the green signal when the three picture sensors are each provided with a color filter for the generation of color television signals, there are, by virtue of the invention, greatly reduced components in the range of the first order carrier signal. In fact when the picture is more or less gray these components are practically cancelled out.

The invention has the advantage that the signal processing for improving the resolution is not only far less expensive and complicated than previously proposed processing for that purpose, but also that the residual interfering components can be eliminated practically entirely.

THE DRAWING

The invention is further described by way of illustrative example with reference to the annexed drawing, in which only the parts of a television camera system which are of consequence for the invention are shown and in which, particularly:

FIG. 1 is a circuit block diagram of a system for carrying out the method of the invention, and FIG. 2 is a graphical representation of the frequency spectrum of a video signal such as can be picked up at one of the several picture sensors.

DESCRIPTION OF THE ILLUSTRATED EMBODIMENTS

Figure 1:
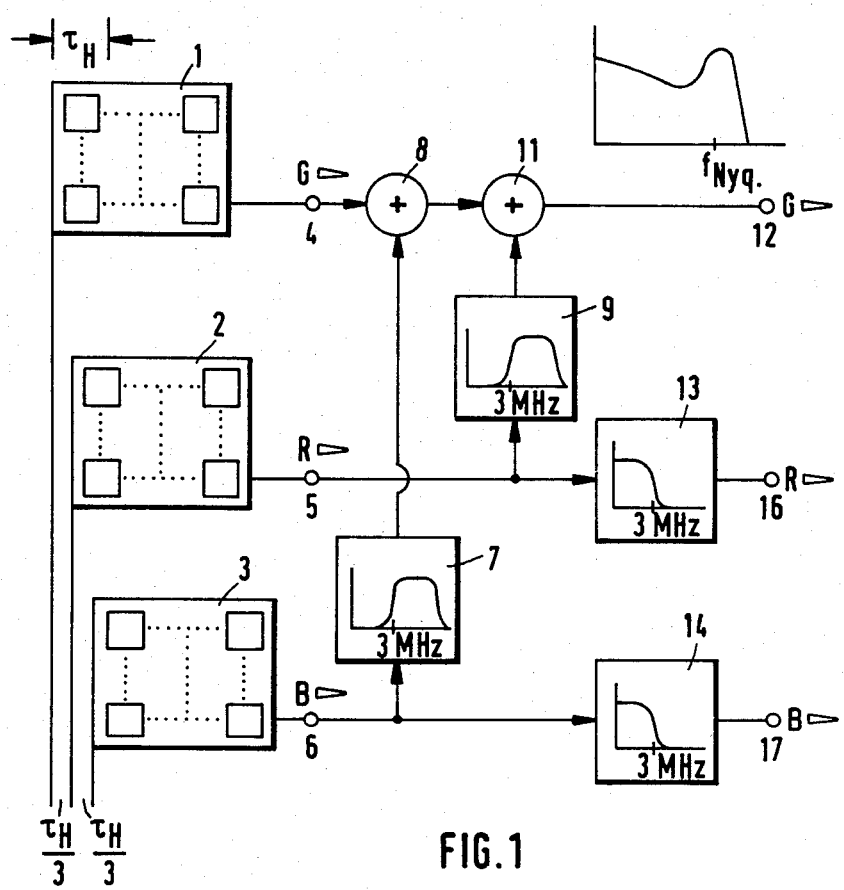
Figure 2:
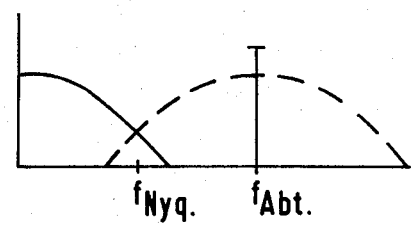
Figure 2:
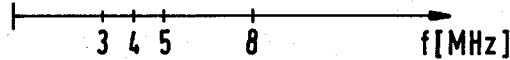

FIG. 1 shows the circuit diagram of the portion of the television camera which concerns the present invention, the color television camera being equipped with three semiconductor sensor arrays 1, 2 and 3, each of which may be called "picture sensor", which are respectively equipped with color filters (not shown in FIG. 1) for respectively generating a green signal G, a red signal R and a blue signal B of a single optical picture focused on the three picture sensors 1, 2 and 3. Each of the three picture sensors 1, 2 and 3 has a multiplicity of discrete picture points, the number of which is the same in each case may be whatever is technologically convenient and/or practical, for example the values described further below. The scanning period (from one picture point to the next) of a picture sensor is $\tau_H$. By a horizontal offset from one to the next of the individual picture sensors 1, 2 and 3, which may be produced by scanning coordination, so that the scanning of corresponding picture points of the respective picture sensors is offset in time by a third of the picture point period of one picture point sensor, three output spectra illustrated graphically in FIG. 2, are produced, in which the carrier frequency components of the first order (more precisely speaking, the sidebands of the first order carrier and that carrier) are shifted with respect to each other by 120° in phase, and the signals with these three output spectra are available at the terminals 4, 5 and 6 of FIG. 1. These terminals are the outputs of the video signals picked upon from the respective picture sensors by scanning. For further information regarding the scanning scheme for the 120° phase offset, reference is made to DE-OS No. 28 39 65, already cited, its English-language disclosure equivalent U.S. Pat. No. 4,249,203, and also U.S. Pat. No. 3,975,760.

Because of the phase relation of the first order carriers, an addition of these carrier frequency components of all three output signals G, R and P would lead to a cancellation or extinction of the disturbing carrier for equal amplitudes of the aforesaid three output signals. This fact is utilized in accordance with the invention by filtering out the carrier frequency components (above about 3 MHz) of the blue signal B by a band filter 7 providing them to an addition stage 8 interposed in the green channel and likewise providing corresponding components of the red signal R by a band filter 9 and supplying them to another addition stage 11 interposed in the green channel. The disturbing carrier and its modulation is thereby eliminated in the green signal G and the usable green signal bandwidth is raised to about 5 MHz (see the frequency spectrum diagram shown just above the output terminal 12 for the processed green signal). The red and blue signals are respectively passed through low-pass filters 13 and 14 (with a cut-off frequency of about 3 MHz) to produce band-limited red and blue signals free of disturbing components and available at the output terminals 16 and 17.

It may be assumed, for example, that in the illustrated embodiment according to FIG. 1 each semiconductor picture sensor 1, 2 and 3 has 420 picture points per line, a point count of this order of magnitude being available by the current picture sensor technology. The signal bandwidth conventionally producible with such picture sensors is about 4 MHz. The optically illuminated arrays have spectral components up to about 5 MHz, however. In the heretofore usual semiconductor sensor camera devices the phenomenon then arises that all the picture components above 4 MHz (this frequency being the Nyquist limit of the picture scan assumed in the above example) appear as disturbing components in the baseband, by virtue accordingly of which only a video signal with about 3 MHz bandwidth can be generated free of such interference.

The system of the present invention makes possible a substantial resolution increase with simultaneous reduction of the interfering components. Because of the low-pass filters 13 and 14 the output signals of the red and blue channels are entirely free of disturbing components. In the green signal a complete extinction of the disturbing carrier and its sidebands is possible only for objects of low chromaticity, whereas with increasing color saturation increasingly strong residues of the disturbing carrier remain, which should prove hardly disturbing in practice, however, because of the properties of the human eye. The red and the blue color components are indeed actually available without error, and only when there are high frequency red or blue components in the subject matter does a supplemental high frequency green component appear.

The luminance signal can be recovered similarly to the provision of the green component in this example, in which case the luminance matrix simultaneously contributes to disturbance supression.

Although the invention has been described with reference to a particular example, it will be understood that some modifications and variations are possible within the inventive concept.

I claim:

1. Method of increasing the resolution of television cameras of the kind using three sets of semiconductor picture sensors having their corresponding picture points relatively offset horizontally, from a point of one set to a point of the next set by 120° in the phase of the picture point scanning period, for each set, comprising the steps of:
   utilizing the picture point signals picked up in the camera from a first set of said semiconductor sensors as a reference signal;
   separating the picture signals picked up in the camera from a second set of said three sets of semiconductor sensors and likewise the signals picked up from the third set of said semiconductor sensors in each case into a first component having an upper frequency limit below the Nyquist frequency of each set and a second component having a lower frequency limit below the Nyquist frequency of each set;
   adding said second component of said signals picked up from said second and third sets of semiconductor sensors to said reference signal for reduction of the first order carrier frequency signals related to the picture point repetition rate of the scanning of said picture point sets, to produce a wide band modified reference signal, and
   utilizing said wide band reference signal and said first components of said signals respectively picked up from said second and third sets of sensors for supplying television signals to a utilization or transmission circuit.

2. Method according to claim 1 in which each of said three sets of semiconductor sensors is provided with a color filter, for producing the respective primary color signals of a color television signal and in which said first set of semiconductor sensors, from which said reference signal is produced, is provided with a filter for producing the green primary color signal.

* * * * *